United States Patent [19]

Abenhaim et al.

[11] 4,299,657
[45] Nov. 10, 1981

[54] PROCESS FOR RUNNING A NUCLEAR REACTOR COOLED WITH LIGHT WATER

[75] Inventors: Georges Abenhaim, Paris; Gérard Francillon, Puteaux, both of France

[73] Assignee: Framatome, Courbevoie, France

[21] Appl. No.: 81,446

[22] Filed: Oct. 3, 1979

[51] Int. Cl.³ .............................................. G21C 7/06
[52] U.S. Cl. .................................... 376/217; 376/328
[58] Field of Search ...................... 176/20 R, 22, 24

[56] References Cited

U.S. PATENT DOCUMENTS 4,057,463  11/1977  Morita .................................... 176/24
4,080,251   3/1978  Musick .................................... 176/24

*Primary Examiner*—Donald P. Walsh
*Attorney, Agent, or Firm*—Haseltine and Lake

[57] ABSTRACT

In a process for running a nuclear reactor cooled with light water, by displacing control rods and modifying the physical and/or chemical state of the coolant, the value of the running parameters of the reactor are continuously measured and recorded and the parameters describing the state of the reactor core are calculated for each substantial modification of the running parameters. The parameters describing the state of the core are measured at defined intervals of time and the calculated parameters are replaced by the measure parameters. The modified parameters resulting from predetermined sequences of action taken on the control rods or the coolant, and the action which must be taken on the running parameters in order to comply with a given program, are calculated by way of predictions. Action is taken on the control rods and the coolant in accordance with the results of the calculation.

5 Claims, 2 Drawing Figures

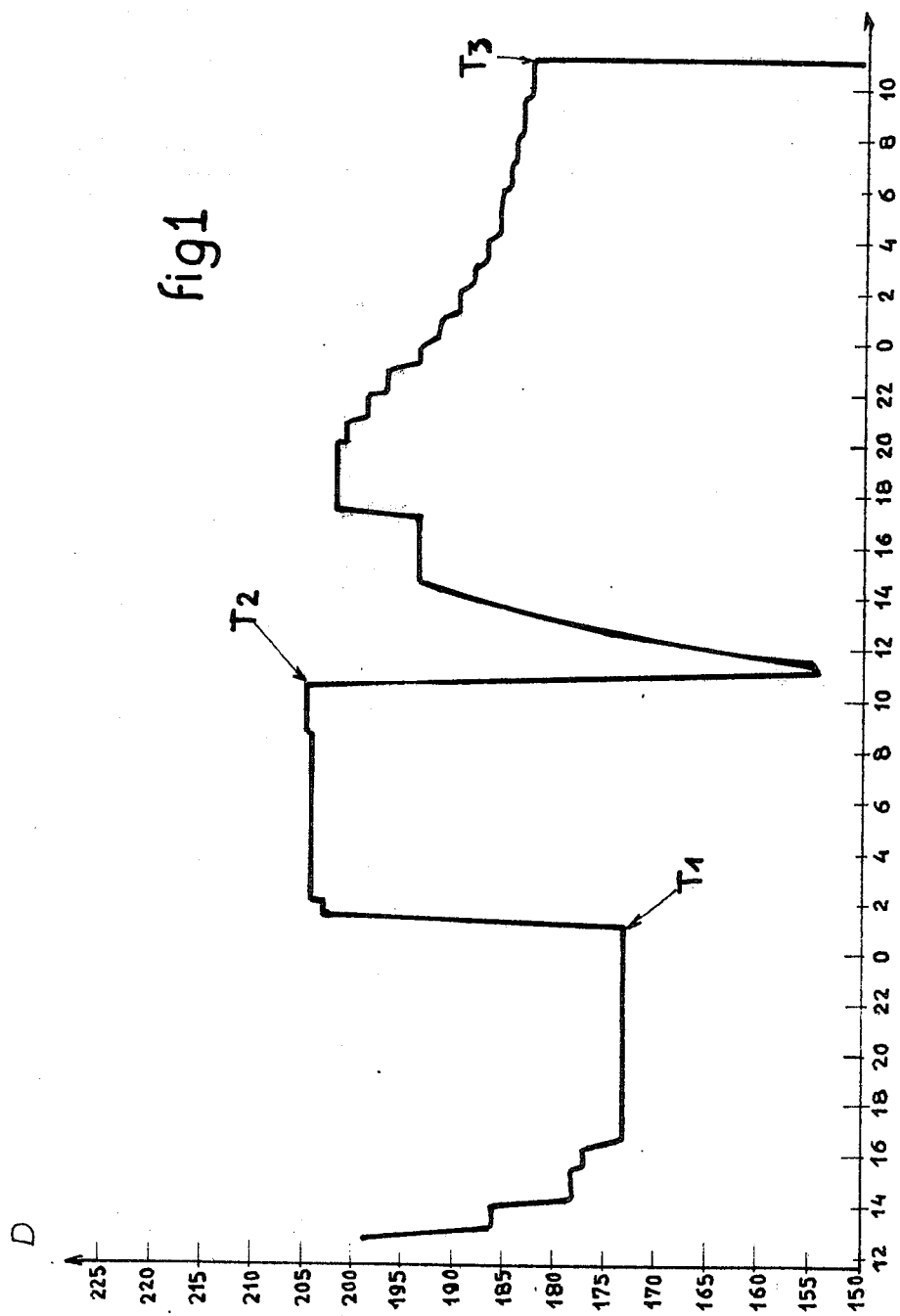

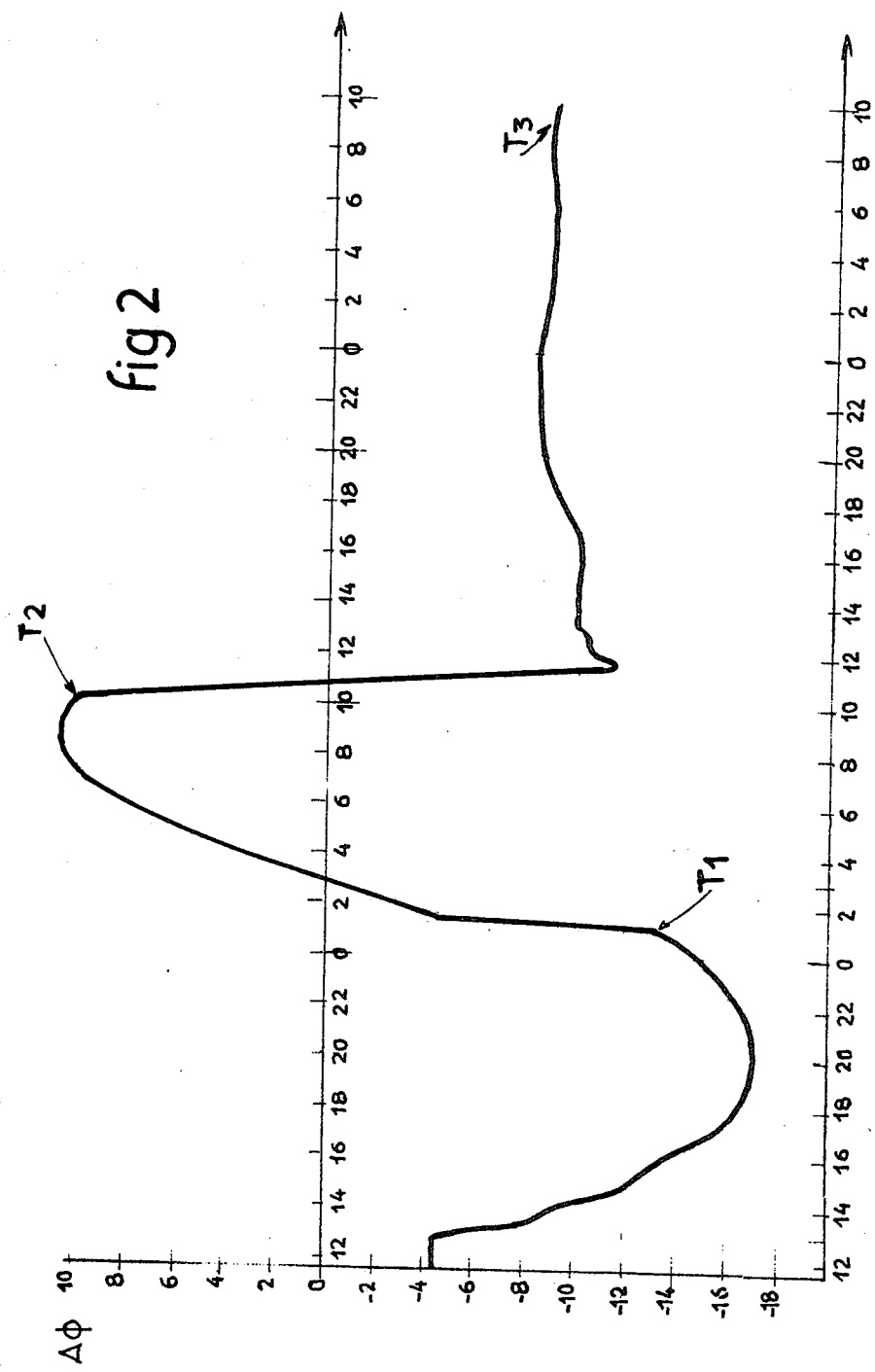

PROCESS FOR RUNNING A NUCLEAR REACTOR COOLED WITH LIGHT WATER

The invention relates to a process for running a nuclear reactor cooled with light water, by displacing control rods and modifying the chemical and/or physical state of the coolant.

To run a nuclear reactor cooled with light water, in particular a nuclear reactor using pressurised water, the operator responsible for this task has the possibility of moving the control rods, consisting of neutron-absorbing material, which are inserted between the fuel rods to a greater or lesser depth and the possibility of influencing the chemical or physical state of the coolant. In particular, the operator must modify the concentration of soluble boron in the coolant, consisting of water, in order to modify its effectiveness as a moderator.

In accordance with a more recent process, the operator can also vary the temperature of the coolant in the cold side, that is to say before it returns to the reactor, so that it will absorb a greater amount of heat and thus provide a larger amount of energy in the case of an increased power requirement at the turbine.

In effecting displacements of the control rods or modifications of the state of the coolant, the operator does not have any point of reference which enables him to know precisely the effect of any action he may take, on the control rods or the state of the coolant, before carrying out the operation.

The only restrictions applied to any action which the operator may undertake are provided by safety devices of the reactor, which are triggered when certain limits have been overstepped, and this triggering of the safety devices is detrimental to the continuous operation of the reactor; the reactor may be stopped in the event of an incorrect manoeuvre by the operator or in the case where the power programme required is too demanding.

Hitherto, it has not been possible to predict the consequences of the actions taken by the operator because adequate calculating means have not been available on site for evaluating the change in the parameters of the reactor, as regards, for example, the flux, the power and the state of the fuel, following an action taken by the operator.

In fact, the mathematical models used hitherto for calculating the changes in the various parameters of the reactor with time, as a function of perturbations introduced by movement of the control rods or modification of the coolant, required the use of very large computers and very long processing times.

To utilise this mathematical model, the readings of the measurements taken at the reactor core were fed in, as the data, after a pre-processing operation to bring the data into numerical form.

The time required to process the measurements taken at the reactor and to feed the data in, taking into account that the calculators capable of using the mathematical model are located at a point far from the site of the nuclear reactor, makes it impossible to use the mathematical model to make predictions concerning the changes in the parameters of the reactor in a sufficiently short time, which predictions would be useful to the operator for optimising the running of the nuclear reactor.

The mathematical models used for calculating the changes in the parameters representing the state of the nuclear reactor core are all derived from equations of the same type, which are the equations for neutron diffusion in the reactor environment. The calculation of the various parameters which are useful for running a nuclear reactor is therefore always based on the same principle, and it has never been possible to render the mathematical models required to carry out these calculations compatible with use near the nuclear reactor, in very short times, in order to assist the operator responsible for running the reactor.

Furthermore, real time processing to implement the mathematical model while the reactor is in operation, and bringing predictions into effect, was not possible because of the time taken by the necessary processing operations, taking into account the means for implementing these in the calculator, compared with the time taken by the operations in the nuclear reactor.

It is an object of the invention to provide a process for running a nuclear reactor cooled with light water, by displacing control rods and modifying the chemical and/or physical state of the coolant, so as to achieve optimum availability of the power of the reactor core at all times, it being necessary for this process to allow predictions to be made relating to the changes in the operating parameters of the reactor, which predictions can be used immediately by the operator responsible for running the reactor.

Accordingly, the following series of operations is carried out:

the instantaneous values of running parameters representing the position of the control rods and the physical and chemical state of the coolant are measured in numerical form and recorded continuously, each time a substantial modification of the running parameters of the reactor has taken place, and at predetermined intervals of time, while the reactor is in operation, and near the reactor, the instantaneous values of certain parameters, relating to the neutron flux in the reactor core, the distribution of the power and the state of the fuel, is calculated, with sufficient precision to run the reactor during a defined interval of time, as a function of the running parameters, the values of the said parameters relating to the state of the core are measured at defined intervals of time, the calculated and the measured values of the said parameters relating to the state of the core are recorded continuously, the calculated values of the said parameters are replaced by the measured values, the modified parameters resulting from predetermined sequences of action taken on the control rods or the state of the coolant, or from programmes of the power to be supplied by the reactor, and the necessary action to be taken on the running parameters in order to follow a power program or to achieve, maintain or provide a given state of the core, are calculated, by way of predictions, from the recorded values of the parameters which have been implemented, taking account of the safety limits of the reactor, and as a function of the results of the calculations, action is taken on the control rods and the state of the coolant automatically or via an operator.

Several operations involved in running a nuclear reactor will now be described by way of example, only use of an embodiment of a process according to the invention making it possible to determine the conditions which are to be observed in order to carry out these operations.

For use in carrying out an embodiment of a process according to the invention, near a nuclear reactor using pressurised water, a calculator having a central memory with a capacity of 128,000 16-bit words, a magnetic disc unit and various peripheral units, such as a printer, a teletypewriter, a display console and a punched card reader, are provided.

The reactor usually comprises automatic control equipment located inside the core, which equipment makes it possible to obtain precise readings relating to the state of the core and provides the activity distribution and a few important neutron factors.

Automatic control equipment is also available outside the reactor vessel, and this makes it possible to measure neutron flux at various heights in the core, and to take physical and chemical measurements at various points, so as to determine the parameters of the reactor (pressure, flow rate, temperature, boron concentration and the like).

This automatic control equipment is used to supply numerical data continuously to the calculator, and the calculator thus receives the instantaneous real data for some of the parameters taken into account in the calculation.

Conventionally, a certain amount of master data is initially supplied to the calculator by means of punched cards or magnetic media. These are the geometrical and neutron data relating to the reactor, such as the effective cross-sections and any other parameter required for the neutron calculations by the mathematical model used.

At the start of the operation, the data relating to the axial distribution of flux, of power and the like, resulting from the previous processing operations or, for example, originating from the internal automatic control equipment, are also fed into the calculator.

The parameters which constitute the data obtained in real time in the nuclear reactor and which are transmitted to the calculator, essentially relate to the position of the control rods, to the inlet and outlet temperatures of the coolant, to the power level required of the reactor, to the boron concentration in the coolant and to the axial flux variation.

As regards the axial flux variation, this parameter represents the ratio $(OH-OB)/(OH+OB)$, in which $OH$ is the neutron flux in the upper half of the core and $OB$ is the neutron flux in the lower half of the core.

The time is also taken into account in the calculator, and the latter records the date and the time corresponding to the various other information which it receives.

From these various data, the calculator continuously provides, in real time, the axial distribution of the power, of the neutron flux, of the exhaustion of the fuel and of the concentration of the xenon formed along the fuel rods, and also the axial variation as defined above.

Some of the calculated parameters are also measured in the nuclear reactor and, in view of the fact that the model has been reduced to essentials in order to enable it to be miniaturised for use on site, certain differences between the calculated and measured values can appear after the reactor has been in operation for a certain period.

Consequently, the calculated values are replaced by the measured values at defined intervals of time in order to readjust the mathematical model.

It is thus possible to use a simplified model, whilst at the same time maintaining good precision during long-term operation, by periodically readjusting the model.

Furthermore, feeding into the calculator the parameters relating to the control rods or the state of the coolant, which are referred to as running parameters and are measured continuously in numerical form, makes it possible continuously to implement the parameters representing the state of the reactor core.

The calculation of the change in the parameters is sufficiently precise to enable the operator to run the reactor.

The master data introduced into the nuclear reactor include the limiting safety values relating to the distribution of power or of flux, the starting point of critical boiling and the factors which might cause the reactor to be shut down.

It is seen that one of the prime functions of the calculator and of the process according to the invention is therefore continuously to calculate and record the parameters representing the state of the reactor core.

On request, the values of the parameters can be edited and these values, obtained at various times, are kept.

The nuclear reactor comprises, as control means, groups of control rods which can be displaced between the fuel rods.

One control method, referred to as the method of constant axial variation, will now be considered with reference to FIGS. 1 and 2 of the accompanying drawings, which are graphs showing the movements of one group D of control rod groups A, B, C and D and the corresponding flux difference changes, with time, respectively.

FIG. 1 shows, during an operation carried out on the reactor, the successive positions, as a function of time, which are occupied by the group D, these positions being measured as the number of steps by which the rods are extracted; this parameter is equal to zero for a completely inserted control rod and is a maximum for a completely extracted control rod.

FIG. 2 shows the corresponding change, as a function of time, in the flux difference, $\Delta\phi = \alpha x(\phi_H - \phi_B)$, following the various maneuvers carried out.

The starting conditions during the operations carried out in a reactor test program are as follows: insertion of the group of control rods D: 199 steps; relative power level: 73% of the nominal power.

After an operating time of a few hours, during which the insertion of the group D has been varied as shown in FIG. 1, and in which $\Delta\phi$ has varied as shown in FIG. 2, it was necessary for the operator to place the group D at 204 steps at the instant T1 in order to trigger a xenon oscillation within the scope of tests to be carried out. The question with which he was faced was therefore to know what boron concentration in the coolant is to be observed in order to run the reactor, that is to say what are the amounts of boric acid or water to be added to the coolant in order to ensure the running of the reactor, taking account of the new insertion of the group D, in keeping with optimal running and, in particular, whilst observing the desired safety limits.

According to the invention, the operator has available a program which is predetermined, as a function of the actions envisaged, for calculating in advance the effects of the new insertion of the group D and the corrections to be made to the boron content of the coolant.

Using this program and the input data corresponding to the desired insertion of the group D, the operator instantaneously obtains the running instructions, on the display screen and on the printer, in the form of the amounts of boric acid to be added to the coolant.

A further program can enable him also to know the change in the xenon poisoning and in the axial flux variation during the hours following the new insertion of the group D and the added amounts of boric acid, depending on the program required.

It is seen that the process according to the invention makes it possible to make predictions relating to the change in the parameters of the reactor and to know the desirable action to be taken in the event of the modification of certain data, such as the insertion of the control rods.

After the instant T1 corresponding to the new insertion of the group of control rods D at 204 steps, and after the modification of the boron content according to the results of the prediction calculation, the flux changes as shown in FIG. 2 up to the instant T2, when it is desired to suppress the xenon oscillation by re-inserting the group D.

In order to effect this stabilisation, it is desired to place the group D at 165 steps and to keep the axial variation within a range of ±3% around its equilibrium value for the insertion of the group D at 165 steps, by modifying the boron content of the coolant.

To do this, the operator has available a program which is capable of calculating the value of the equilibrium axial variation with the group D at 165 steps, and a program which is capable of determining the amounts of water or boric acid which are to be added to the coolant in order to keep this axial variation within a range of ±3% around the previously calculated value.

The operator can thus run the reactor with advance knowledge of all the maneuvers which are to be carried out in order to damp the xenon oscillation.

In the case of the operation shown in FIG. 1, this is a real manipulation carried out by an operator who had no advance knowledge of the value of the equilibrium axial variation and the action to be taken on the concentration of soluble boron in the coolant, and it is seen that, in this manner, the axial variation is stabilised at a value which in fact corresponds to equilibrium with the group D at 180 steps.

For an independent reason, an emergency shut-down takes place at the instant T3 and, at this juncture, the operator again has the possibility of using the calculator to determine the maneuvers required for re-starting. In fact, after the re-starting of the installation, it is necessary to determine the action to be taken on the concentration of boron in the coolant in order to be able to keep the regulating groups in the position for rapid return of power.

A so-called "re-starting after shut-down" program makes it possible, by supplying, as the input data, either the position of the clusters of control rods for return of power, or the power level, to know, for a certain time following the shut-down, the action which is to be taken on the concentration of soluble boron in the coolant.

The calculator will then provide the operator, at the desired moment, with the instructions for the maneuvers to be carried out.

Thus, it is seen that the process according to the invention makes it possible not only to avoid emergency shut-downs by predicting the possibility or the impossibility of the maneuvers envisaged by the operator interrogating the calculator, but also safely to carry out maneuvers such as re-starting after emergency shut-down.

The number of tasks which can be assigned to the calculator is not restricted to the field of prediction calculations, because it is possible to envisage programs for calculations corresponding to very substantially different situations and to diverse series of operations.

Thus, it is possible to calculate the variations in any parameter, such as the power level, the position of the control rods, the concentration of soluble boron or the inlet and outlet temperatures of the cooling fluid, as a result of any modification of a running parameter of the reactor. These prediction calculations can be carried out by imposing certain conditions relating, for example, to the value of the reactivity or of the axial variation.

It is also possible to envisage more complex programs corresponding, for example, to the determination of the maneuvers which are to be carried out within the scope of a load program, that is to say a program of the power to be supplied by the reactor as a function of time.

Any power program can be followed, for example a program comprising extremely rapid power variations, such as in the case where the nuclear power station operates by remote control.

In all cases, the prediction calculations or the instructions relating to the running of the reactor, which instructions are determined by the calculator, take account of the safety limits of the reactor and any incorrect maneuver is thus avoided.

The calculator can also be used to perform other functions, for example the processing of the measurements taken in the reactor core when carrying out tests or after an incident, or also to determine the state of the fuel extremely precisely. Very much faster processing is thus achieved than in the case where the processing was carried out far from the site of the reactor.

It is therefore seen that the advantages of the process according to the invention are that it makes it possible to calculate in real time, while the reaction is in operation, all the parameters which are useful for running this reactor, taking account of the safety limits and of the power program to be observed.

Having a numerical representation, of the state of the reactor core, permanently on site makes it possible to carry out any type of prediction calculation or to comply with any power program and provides the operator with the possibility of knowing in advance the results of the action which he may have to take, or the action which is to be taken, for a given purpose.

A further advantage of the process according to the invention is that it enables the reactor to operate with a reduced discharge of effluent, because the action taken on the soluble boron in the cooling fluid is taken extremely precisely. It is possible to introduce into the calculation, as an additional condition, minimisation of the discharge of effluent or reduction of the movements of the control rods to a minimum or any other parameter taken as a controlled condition.

The process according to the invention is not restricted to the embodiment which has been described; on the contrary, it includes all the variants thereof.

Thus, the calculations required for the instantaneous knowledge of all the parameters can be carried out by a calculator of any type, using a suitable mathematical model derived from the neutron diffusion calculations, provided that the processing times are compatible with the use of the calculator in real time and with the possibility of conversation between the operator and the calculator in order to obtain, by means of prediction calculations, the effects of maneuvers which the operator may have to carry out.

Apart from the parameters which have been mentioned, the calculated parameters which are useful for running the reactor can comprise other parameters, the degree of precision of the numerical representations of the phenomena taking place in the core being limited only by the possibility of achieving this precision with a calculator used on site and for processing times which are compatible with the use of the process in real time.

In the example which has been described, the running process according to the invention was applied, in the case of operation with constant axial variation, using groups of very absorbent control rods, but it is understood that the invention also applies in the case of other methods of operation, for example in the case of operation using less absorbent groups, referred to as grey groups, and a regulating group, as described in French patent application No. 77/19,316.

In the example which has been described, the action was taken by an operator who interrogated the calculator in order to obtain prediction calculations or instructions for the action to be taken, but it is possible to envisage means which respond automatically to the orders given by the calculator for running the nuclear reactor.

However, where an operator is concerned, the process according to the invention makes it possible, by way of an experiment, to study, as a simulation, different running methods envisaged by the operator, the results of these new operational methods being obtained rapidly and automatically.

Finally, the process according to the invention can be applied not only to reactors using pressurised water but also to other types of reactor using water as the cooling fluid.

We claim:

1. In a process for running a nuclear reactor cooled with light water, by displacing control rods and modifying the chemical and/or physical state of the coolant, so as to achieve optimum availability of the power of the reactor core at all times, said process having calculations of values of parameters related to the state of the reactor taking account of the safety limits of the reactor, and are made to control the evolution of the core of the reactor, the improvements comprising: measuring in numerical form and recording continuously the instantaneous values of running parameters representing the position of said control rods and the physical and chemical state of said coolant; each time a substantial modification of said running parameters of the reactor has taken place, and at predetermined intervals of time, while the reactor is in operation, and near the reactor, calculating the instantaneous values of certain parameters, relating to the neutron flux in the reactor core, the distribution of the power and the state of the fuel, with sufficient precision to run the reactor during a defined interval of time, as a function of said running parameters; measuring the values of said parameters relating to the state of the core at defined intervals of time; recording continuously said calculated and said measured values of said parameters relating to the state of the core; replacing said calculated values of said parameters by said measured values; calculating modified parameters resulting from predetermined sequences of action taken on said control rods or the state of said coolant, or from programs of the power to be supplied by the reactor, and the necessary action to be taken on said running parameters in order to follow a power program or to achieve, maintain or provide a given state of said core, by way of predictions, from said recorded values of said parameters which have been implemented, taking account of the safety limits of the reactor; and as a function of the results of said calculations, acting on said control rods and the state of said coolant automatically or via an operator.

2. A process for running a nuclear reactor using pressurised water, according to claim 1, wherein the state of said coolant is modified by modifying the concentration of soluble boron in said coolant by adding water or boric acid thereto.

3. A process according to claim 2, wherein said calculations and said prediction of the action to be taken on the concentration of soluble boron take account of a condition relating to a minimum discharge of effluent.

4. A process according to claim 1, wherein said calculation and said prediction of the movements of said control rods take account of a condition relating to a reduction in the movements of the control rods to a minimum.

5. A process according to claim 1 or claim 2 or claim 3 or claim 4, wherein said calculated parameters relate to the distribution, along the axial direction of the reactor, of the power or of the neutron flux, of the exhaustion of the fuel and of the concentration of the xenon formed, and also to the axial flux variation and the reactivity.

* * * * *

UNITED STATES PATENT AND TRADEMARK OFFICE
CERTIFICATE OF CORRECTION

PATENT NO. : 4,299,657

DATED : November 10, 1981

INVENTOR(S) : Abenhaim et al

It is certified that error appears in the above—identified patent and that said Letters Patent is hereby corrected as shown below:

On the title page insert Foreign Priority Data

-- October 5, 1978     France     78-28526 --.

Signed and Sealed this

Ninth Day of March 1982

[SEAL]

Attest:

GERALD J. MOSSINGHOFF

*Attesting Officer*     *Commissioner of Patents and Trademarks*